United States Patent [19]

Leiber

[11] Patent Number: 4,510,905

[45] Date of Patent: Apr. 16, 1985

[54] SPEED CONTROL APPARATUS FOR VEHICLES

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 515,249

[22] Filed: Jul. 19, 1983

[30] Foreign Application Priority Data

Jul. 30, 1982 [DE] Fed. Rep. of Germany ....... 3228455

[51] Int. Cl.$^3$ ............................................. F02D 9/02
[52] U.S. Cl. ..................................... 123/360; 123/399; 123/401
[58] Field of Search ............... 123/360, 378, 399, 400, 123/401, 478, 480, 357

[56] References Cited

U.S. PATENT DOCUMENTS

| | | | |
|---|---|---|---|
| 2,897,906 | 8/1959 | Brueder | 123/360 X |
| 3,724,430 | 4/1973 | Adler | 123/360 X |
| 4,168,679 | 9/1979 | Ikeura et al. | 123/399 X |
| 4,335,694 | 6/1982 | Mausner et al. | 123/480 X |
| 4,418,673 | 12/1983 | Tominari et al. | 123/480 X |

Primary Examiner—Tony M. Argenbright
Attorney, Agent, or Firm—Edwin E. Greigg

[57] ABSTRACT

A speed control apparatus is proposed for motor vehicles driven by internal combustion engines and having a hydraulic connecting line between a first hydraulic adjusting cylinder, which is actuatable by the gas pedal, and a second hydraulic adjusting cylinder, which is connected with the throttle valve, the regulating rod of an injection pump in the case of Diesel engines, and the like for adjusting the operating status of the engine. A multiple-position valve is furthermore disposed in the hydraulic connecting line, this valve receiving control commands from an electronic control circuit. The electronic control circuit compares its input signals, provided by transducers, from the first and second hydraulic adjusting cylinders and reacts further such as to provide a supervisory intervention in further regulating control subsystems for the purpose of engine regulation.

8 Claims, 2 Drawing Figures

SPEED CONTROL APPARATUS FOR VEHICLES

BACKGROUND OF THE INVENTION

The invention is based on a speed control apparatus as generally defined hereinafter. For controlling the speed of vehicles, especially those equipped with internal combustion engines to drive them, it is known to dispose a train of circuit elements, amplifiers, comparators and final control elements, which replaces a mechanical linkage apparatus, between the first final control element subjected to arbitrary influence on the part of the vehicle driver (such as a gas pedal or the like) and the element which causes the engine to change its rpm or the torque which it puts out. Circuit systems of this kind, which are also known in the form of the so-called electronic gas pedal, known as "E-gas," have several advantages, among them that supplementary data can be incorporated into the engine control system, these data being evaluated such that unequivocally expressed wishes of the driver [regarding vehicle performance] can be put into practice at operating points of the engine having minimum fuel consumption. It is also possible for the transitions between the three ranges of acceleration, constant speed and deceleration to be embodied such that they can be adjusted smoothly and well. In addition to the advantages in terms of fuel consumption, the electronic gas pedal is also suitable for the larger classes of vehicles in particular, or in instances where a complicated guidance of the mechanical linkage from the gas pedal to a throttle valve in the intake tube of the engine, for instance, is required. Finally, it is possible to take into consideration additional functions such as those of a drive slippage and vehicle speed regulation system.

However, it could be considered disadvantageous in an electronic gas pedal regulating system that in the case of failure, for instance if the electrical power supply or some other system fails, then the components of the vehicle which participate in the control or regulation systems are virtually inoperable; also it must be expected that the electronic gas pedal control system and safety circuit will be associated with relatively high cost and will be complicated in structure.

OBJECT AND SUMMARY OF THE INVENTION

The speed control apparatus according to the invention has the advantage over this prior art of a superior failure response when either electrical problems or problems with the supply of pressure medium arise. Satisfactory emergency operation can be maintained, and if a supply of pressure medium is already in place then a structure can simultaneously be attained which is lightweight, simple and favorable in cost. While retaining the above-discussed advantages of the electronic gas pedal known per se, the invention also enables the same engine control functions as with that system, that is, regulation of both drive slippage and vehicle speed as well as of engine idling and overrunning. In an advantageous manner, there is also a feedback effect on the gas pedal, for instance in the case of drive slippage regulation (DSR), which corresponds to a warning to the vehicle driver that physical limits are being approached. In that case, the gas pedal cannot be depressed fully. As the DSR function comes into action, the actuation characteristic is determined by a small piston-type accumulator.

The hydraulic actuation of adjusting members furthermore enables direct control, for instance of the injection pumps in the case of Diesel engines. Finally, even if the capacity of the system is entirely exhausted, that is, when the hydraulic power assist offered by the use of an electrohydraulic final control element is exploited, the adjustment still takes place with low time constants.

It is particularly advantageous to embody the electrohydraulic final control element as a 4/4-way magnetic valve, a given position thereof being determined by a supervisory electric or electronic control circuit. By combining a hydraulic final control element, an electrohydraulic magnetic valve and an electronic control circuit, it is possible to impose a multiplicity of further signals, for which allowance can be made, on the regulation system; such signals can encompass not only the maintenance of operating within operating points of minimal fuel consumption but also signals relating to drive slippage regulation or vehicle speed regulation.

The invention will be better understood and futher objects and advantages thereof will become more apparent from the ensuing detailed description of a preferred embodiment taken in conjunction with the drawings.

DESCRIPTION OF THE PREFERRED EMBODIMENT

The basic concept of the present invention is the use of a hydraulic gas system or a so-called "H-gas system" for engine control in motor vehicles. In the simplest case, such a system includes, first, the disposition of a hydraulic connecting line between a first final control element (gas pedal) actuated arbitrarily by the driver and a second final control element, which in the exemplary embodiment illustrated herein is a throttle valve final control element, and second, the disposition of an electrohydraulic final control element (multiple-position valve) in the course of the hydraulic line.

Figure 1:
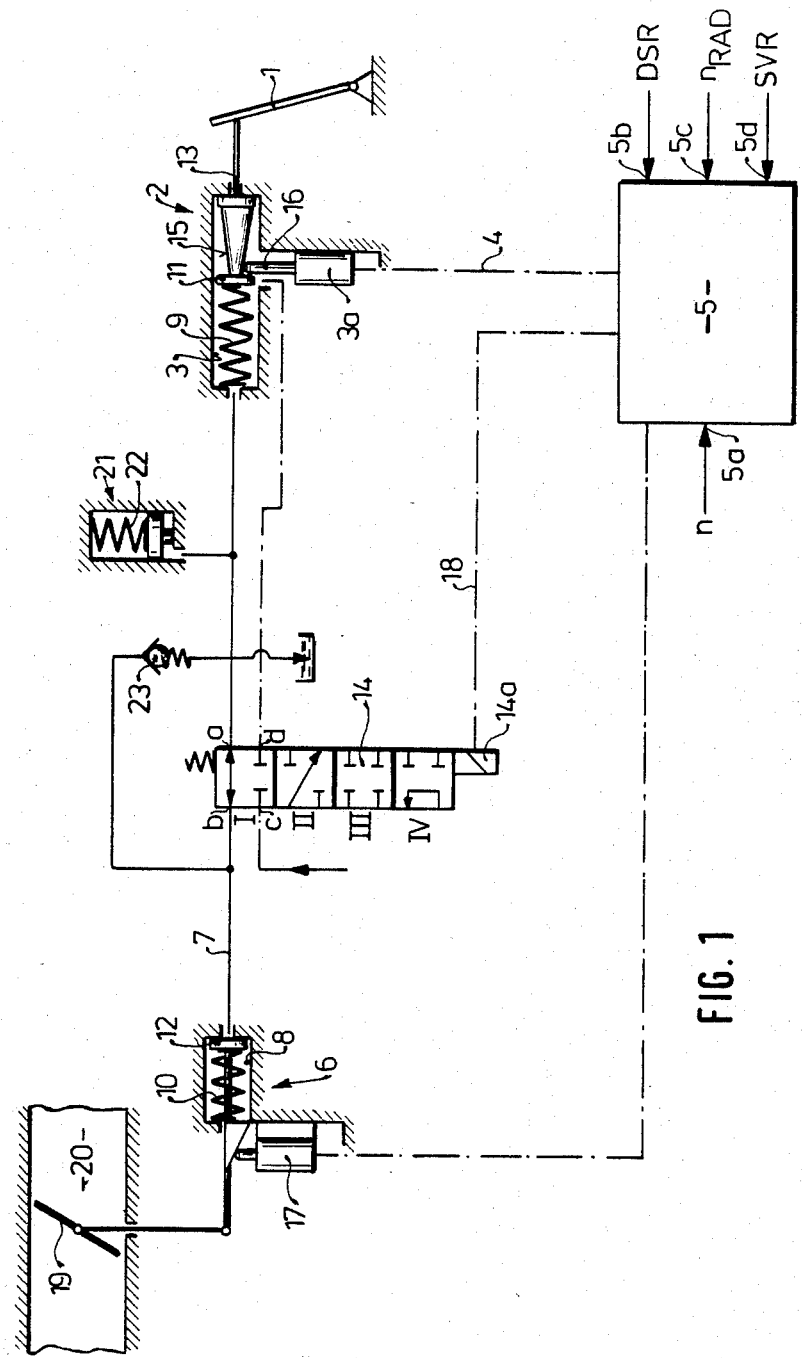
FIG. 1 illustrates in partially schematic and block diagram configuration the usage of a preferable embodiment according to the invention of a hydraulic speed regulation system, as applied to an internal combustion engine having throttle valve control in the intake tube.

In FIG. 1, a gas or driving pedal, which is arbitrarily variable in its position by the driver of a motor vehicle, is identified as 1; the gas pedal acts upon a first final control element 2, comprising a hydraulic cylinder 3 and an associated transducer 3a. The transducer 3a is embodied such that it detects the adjusting displacement of the hydraulic adjusting cylinder 3, converts it at its output to a preferably electrical signal and delivers it via an electric connecting line 4 to an electronic control circuit 5. It should be noted that in the drawing, electric connecting lines are indicated by dot-dash lines, while hydraulic connecting lines are represented by dashed or solid lines. The connecting line between the first final control element 2 and a second final control element 6 is embodied as a hydraulic line 7 as indicated. Each hydraulic adjusting cylinder 3 and 8 belonging to the first and second final control element 2 and 6, respectively, includes a prestressing spring 9 and 10 and a piston 11 and 12, respectively, these latter two elements being shown for the sake of explaining the mode of operation of the adjusting cylinders; however, in a practical realization of the exemplary embodiment they may be realized in different forms. The piston 11 of the first final control element 2 is acted upon mechanically by the connection generally identified as 13 with the gas pedal 1, causing a displacement of the piston 11 and a corresponding flow of pressure medium in the hydraulic line 7 to the hydraulic cylinder 8 of the second final control element, although only in the position shown in the drawing where the electrohydraulic final control element 14 is still switched into the hydraulic line. It should be noted at this point that this switching position of the electrohydraulic final control element corresponds to the special case in vehicle operation where there is no hydraulic power assist to the system, or to the case of emergency operation; this will be discussed in greater detail further below.

The position of the gas pedal at a given time can be detected in the form of a mechanical displacement via a mechanical transmission device shown in simplified form in the drawing, specifically a suitable oblique face 15 in the mechanical transmission rod 13 between the gas pedal 1 and the piston or slide valve of the hydraulic adjusting cylinder 3; the displacement is picked up by the transducer 3a via a scanning member 16, which accordingly travels in the manner of a cam over the oblique face 15. The embodiment of the transducer 3a is in principle arbitrary and may encompass any desired form of a displacement-to-voltage converter or a displacement-to-frequency converter. Accordingly, an electrical set-point signal for the driving pedal position travels from the output of the transducer 3a at the first final control element 2 to the electric or electric control or logic circuit, and in a corresponding fashion an electric signal corresponding to an actual value, in this case for the position of the throttle valve, travels from the output of a further transducer 17 associated with the second final control element 6 to the electronic control circuit. It will be understood that the manner in which the displacement movements of the pistons of the adjusting cylinders are detected is arbitrary; for instance, potentiometers used as transducers for generating the electrical set-point and actual-value signals could also be provided.

The electrohydraulic final control element disposed between the two hydraulic adjusting cylinders is preferably a 4/4-way magnetic valve; the positions to be assumed by this magnetic valve in accordance with the electrical adjusting signal delivered at a given time are marked I-IV. The connection a of the magnetic valve is connected with the pressure output of the hydraulic adjusting cylinder 3 of the first final control element 2; the connection b is connected with the adjusting cylinder 8 determining the throttle valve position; the connection c serves to supply pressure medium from a separate source of pressure medium (not shown in the drawing), for which the pressure supply for other basic systems is already present, such as power steering, transmission and anti-skid brake system (ABS), can preferably be used as well; and the connection d serves to effect the outflow of pressure medium into a return flow system, which is schematically shown in the form of a pressure medium sump.

Figure 2:
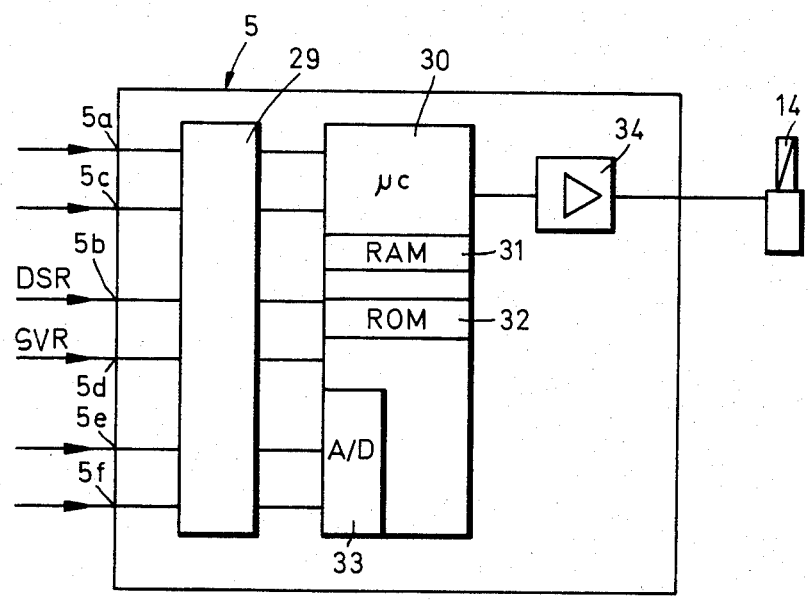
FIG. 2 is a block circuit diagram illustrating an electronic control circuit.

The embodiment of the electronic control circuit is shown in FIG. 2. The control circuit 5 is supplied with various signals relating to the operating status of the engine, these being an rpm signal n at its input 5a and additional signals for supplementary functions, specifically a drive slippage regulation signal DSR at 5b, an rpm signal relating to the effective wheel rotation $n_{Rad}$ at 5c, and so-called VSR signals, deriving from a vehicle speed regulating switch, at 5d. Finally, the electronic control circuit 5 is also supplied with the driving pedal position signal at 5e (via the line 4) and the throttle valve position signal at 5f. The final control element 6 for the throttle valve adjustment is triggered (it will be understood that any other element affecting the given operating state of the engine can be triggered and adjusted here as well) whenever deviations in the positional association of the transducer signals occur or whenever a supervisory intervention by subsystems for engine regulation, such as may be present at the electronic control circuit 5, is required or desirable.

The electronic regulating circuit may be made up of discrete components; however, it preferably includes circuits and systems which are grouped around a microcomputer or a microprocessor 30, in the latter case in addition with solid-state memories in the form of a RAM 31 and/or a ROM 32. The various input signals travel via an intermediate circuit or interface circuit 29 to the microcomputer 30, and data supplied in analog form are converted to digital form via an additionally provided analog-to-digital converter 33, so that the evaluation and further processing can be effected by means of the microcomputer 30. The microcomputer is then embodied, in combination with its associated memories, such that the following functional description can be realized; that is, essentially what is done is that comparisons are performed by the microcomputer while observing corresponding regulating functions stored in the memory as well as other functional processes. Output signals travel to a final amplifier 34, which then triggers the electromagnetic part 14a of the magnetic valve 14. The various circuit courses are stored in the form of a program in the memories of the microcomputer and therefore need not be discussed in detail here. It is furthermore essential that in case of a possible failure of the electric or electronic portion of the apparatus and an attendant absence of trigger signals to the magnetic part 14a, the magnetic valve 14 will remain in the position shown in FIG. 1 or will return to such a position, so that appropriate emergency operation is possible by means of the direct hydraulic connection of the final control element 2 with the final control element 6.

The resultant functioning of the system above-described, in detail, is as follows—taking as a first example the application of the invention to an exploitation of the hydraulic power assist. After the asjusting cylinder 3 is actuated via the gas pedal, the associated transducer 3a is also activated, the output signal of which is then compared with that from the position transducer 17 on the hydraulic adjusting cylinder 8 of the second final control element 6. A deviation of the two signals in the positive direction then produces an output signal of a comparator circuit not shown but encompassed by the electronic control circuit 5 and results in the delivery of a corresponding electrical signal to the magnetic portion 14a of the magnetic valve 14 via the output line 18, which switches the multiple-position magnetic valve into its position IV. The result, via the connections b and c which in this instance are interconnected, is a feeding of pressure at the adjusting cylinder 8 of the final control element 6 and a corresponding displacement of the throttle valve 19 in the intake tube 20. This displacement of the adjusting cylinder finally produces a zero regulatory deviation, causing the multiple-position valve to switch over to its third switching position III, in response to the now-varied triggering by the output of the electronic control circuit; in position III, all the connections a, b, c and d are interconnected. If the pressure exerted on the gas pedal is reduced, then the result in this case if a regulatory deviation which is considered to be negative; this then causes the multiple-position valve 14, upon being triggered by the electronic control circuit 5, to move into the second switching position II, causing pressure medium to flow out of the adjusting cylinder 8 into the return flow system.

This primary function of the H-gas system according to the invention which has just been explained is realized by disposing a relatively small piston-type accumulator 21 in the connecting line leading from the adjusting cylinder 3 to the connection "a" of the multiple-position magnetic valve 14. The piston-type accumulator 21, the design of which does not need to be discussed in detail here, has the purpose, in the instance of the application of the hydraulic power assist, of enabling or assisting the movement of the transducer cylinder (3, 3a) and thus the pre-specification of a desired set-point value, whenever the magnetic valve 14 is in one of its switching positions II-IV, since in this instance the connection from the transducer side to adjusting cylinder 8 is interrupted, as the positions II, III and IV of the valve 14 shown in the drawing indicate. Thus, whenever the magnetic valve is located in one of the positions II, III or IV, that is, at positions in which the direction connection from the output of the transducer cylinder 3 to the receiver cylinder 8 is interrupted (1), it (21) nevertheless permits a movement of the piston in the transducer-cylinder, this being accomplished in that the piston-type accumulator receives the quantity of pressure medium positively displaced out of the transducer-cylinder 3. This then enables the transducer 2 to execute a displacement, despite the interruption by the magnetic valve 14 of the hydraulic connection, so that the transducer 3a—which may also be any sort of hydraulic piston—cylinder apparatus—is capable of absorbing this displacement desired by the driver (i.e. this set-point value), converting it and supplying it to the control circuit 5. In other words, if the hydraulic transducer-cylinder 3 is blocked because of the interrupted line effected by the magnetic valve 14, then it would not even be possible for the driving pedal to be actuated by the driver. In an advantageous embodiment, the spring 22 of the small piston accumulator can be realized progressively, that is, of a graduated response.

Since the power required for actuating the throttle valve 19 is relatively slight, the hydraulic line 7 from the first final control element to the adjusting cylinder 8 can be embodied as a low-pressure line. On the other hand, it is desirable and useful for the H-gas system according to the invention to be efficiently coupled with another hydraulic system and its pressure supply, so as to keep costs down. However, since such existing hydraulic systems for operating motor vehicles are as a rule embodied as medium- or high-pressure systems, the low-pressure line is protected via a check valve 23. This protection is useful for the failure mode where an excessively high pressure level may arise as a consequence of a possible wrong connection of the magnetic valve 14 in the hydraulic line 7. More specifically, the hydraulic gas pedal according to the invention must receive a supply of pressure at the input line in FIG. 1, this supply being provided to the input connection "c" of the magnetic valve 14. This pressure supply may be diverted from already-existing hydraulic pressure systems, such as medium- or high-pressure systems, such as are also found in a hydraulic brake-force amplifier system in motor vehicles. Pressure is then drawn from these systems, and the relief valve 23 then has the purpose of reducing possible high pressures in the low-pressure area of the present invention.

In the present invention, the following advantageous embodiments are possible as well. If the system is operating in the idling mode, then the supply of pressure medium is effected by switching the magnetic valve 14 into position IV, and a corresponding regulating of idling rpm is possible by supplying and evaluating the engine speed at the input 5a of the electronic regulating circuit 5.

The electronic regulating circuit is furthermore designed such that the regulating circuit discussed above with respect to the basic function of the invention is broken whenever the electronic regulating circuit 5 receives signals from a regulating drive slippage or vehicle speed measuring device. It will be appreciated that the H-gas system according to the invention is particularly well suited, in addition, to regulating vehicle speed in combination with the basic circuitry and its augmentation, because since the control unit is supplied with data for the wheel speed as well as the switch signals of the vehicle speed regulator (VSR), this control unit can easily trigger the multiple-position magnetic valve 14 in such a manner that a desired vehicle speed is adhered to by means of the independent displacement of the throttle valve.

In the case of the superimposition of the drive slippage regulation (DSR), the signals of that system cause the throttle valve, or the regulating rod of a Diesel injection pump as well, to be set back or closed, in order to reduce the engine torque or, as the occasion requires, to increase it. The DSR signals are then prepared in a special circuit, not shown here, which is known per se and may, depending on its embodiment, include a specialized regulating logarithm which substantially processes the wheel speed data, the throttle valve position and the engine rpm. In this case again, the H-gas system is particularly advantageously suited for drive slippage regulation, because as a result of the various independently selected operating positions of the multiple-position valve, there is a feedback effect on the gas pedal and a corresponding warning is therefore provided to the vehicle driver, which is highly desirable. Because as a result of the function of drive slippage regulation, it is also possible for a motor vehicle to be already approaching physical limits in terms of its driving stability without the driver's awareness, especially under winter road conditions, since it is in fact the purpose of the drive slippage regulation to prevent the kind of feedback that would be caused by skidding wheels or yawing or slewing movement on the part of the vehicle itself. However, the driver does perceive the onset of the drive slippage regulation from the stiff, or increasingly stiff, gas pedal, since in that case, under the supervisory control of the electronic control circuit which gives priority attention to the DSR signals, the magnetic valve operates in one of the positions II-IV and the connection "a" is blocked.

Finally, in the event of various malfunctions such as when the electronic triggering fails or when there is a short circuit in the vehicle electrical system or the like, the multiple-position valve 14 returns to the outset position I shown in the drawing, and in that case it then establishes a continuous hydraulic connection between the first final control element and the adjusting cylinder engaging the throttle valve.

In addition to the use of the H-gas system according to the invention for engine control, for instance when regulating idling rpm, the clutch and the vehicle speed, the invention is also particularly well suited for power reduction and reducing fuel consumption by means of determining a given operating point by controlling the performance graph or characteristic curve data of the engine.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A speed control apparatus for motor vehicles driven by internal combustion engines, having a first final control element actuatable by the vehicle driver and a second final control element engaging a fuel control means for influencing the operating status of the engine, the improvement comprising a first hydraulic adjusting cylinder for said first final control element, and a second hydraulic adjusting cylinder for said second final control element for mechanically adjusting said fuel control means, said first and second hydraulic adjusting cylinders being connected via a hydraulic connecting line, an electrohydraulic multiple-position valve having at least two switching positions being interposed into said hydraulic connecting line, and a control circuit for determining the particular switching position assumed by said multiple-position valve and having at least one signal derived from the operation of the engine supplied thereto.

2. An apparatus as defined by claim 1, wherein said first final control element comprises a transducer means, the output of which is connected to said control circuit for comparison with the output of an actual-value transducer means connected to said second final control element, and the output of said control circuit being connected with a magnetic element of said multiple-position valve.

3. An apparatus as defined by claim 1, further comprising a control circuit having plural regulating subsystems for regulating the engine operating status with associated regulatory control signals for effecting supervisory interventions at said multiple-position valve.

4. An apparatus as defined by claim 1, wherein said multiple-position valve comprises a 4/4-way valve having a first position in which the connections of said hydraulic adjusting cylinders of said respective final control elements are through-connected, a second position in which the connection to said second hydraulic adjusting cylinder of said second final control element is opened into a return flow system, a third position in which all the connections are blocked off with respect to one another, and a fourth position in which said second hydraulic adjusting cylinder of said second final control element is connected with a pressure supply means.

5. An apparatus as defined by claim 4, wherein with the connection of said pressure supply to an existing pressure system of said motor vehicles, said connecting line between said final control elements is a low-pressure line and is protected by means of a check valve means.

6. An apparatus as defined by claim 1, further comprising a piston-type accumulator disposed in said connecting line between said first adjusting cylinder of said first final control element and said multiple-position valve.

7. An apparatus as defined by claim 1, further comprising a hydraulic brake force booster for assisting said first and second adjusting cylinders.

8. An apparatus as defined by claim 1, wherein said connecting line is connected to the pressure sypply of a hydraulic brake force booster.

* * * * *